United States Patent

Ebisch

[15] 3,678,394

[45] July 18, 1972

[54] SUPERHETERODYNE RECEIVER WITH AUTOMATIC TUNING TO A RECEPTION FREQUENCY

[72] Inventor: Martin Ebisch, Hohenschaeftlarn, Germany

[73] Assignee: Siemens Aktiengesellschaft, Berlin and Munich, Germany

[22] Filed: March 23, 1970

[21] Appl. No.: 21,880

[30] Foreign Application Priority Data

March 24, 1969 Germany ......................P 19 14 919.0

[52] U.S. Cl. ..............................325/423, 325/421, 325/477, 329/122

[51] Int. Cl. ..........................................................H04b 1/26

[58] Field of Search .........................325/346–349, 416–420, 325/422, 423, 472, 473, 477; 329/122, 123; 328/165

[56] References Cited

UNITED STATES PATENTS

| | | | |
|---|---|---|---|
| 3,343,092 | 9/1967 | Davids et al. | 325/423 |
| 2,844,713 | 7/1958 | Zuckerman | 325/346 |

FOREIGN PATENTS OR APPLICATIONS

| | | | |
|---|---|---|---|
| 117,053 | 6/1943 | Great Britain | 325/423 |

*Primary Examiner*—Albert J. Mayer
*Attorney*—Hill, Sherman, Meroni, Gross & Simpson

[57] ABSTRACT

A superheterodyne receiver having an automatic intermediate frequency control circuit with means to prevent the faulty regulation thereof. The receiver has means for receiving a radio frequency signal and mixing the same with the output of a superheterodyne oscillator. This produces an intermediate frequency signal which is coupled to a frequency or phase discriminator to produce an error signal for controlling the frequency of the superheterodyne oscillator. A regulation circuit is provided having an electronic switch to interrupt the feedback circuit when only unwanted frequencies tend to produce faulty regulation of the superheterodyne oscillator.

4 Claims, 3 Drawing Figures

INVENTOR
Martin Ebisch

BY Hill, Sherman, Meroni, Gross & Simpson ATTORNEYS

SUPERHETERODYNE RECEIVER WITH AUTOMATIC TUNING TO A RECEPTION FREQUENCY

BACKGROUND OF THE INVENTION

Field of the Invention

The field of art to which this invention pertains is superheterodyne receivers and in particular to regulating the intermediate frequency thereof. This invention particularly relates to means to prevent unwanted frequencies from interfering with the regulation of the superheterodyne oscillator.

SUMMARY OF THE INVENTION

It is an important feature of the present invention to provide an improved superheterodyne receiver.

It is another feature of the present invention to provide means for stabilizing the intermediate frequency of a superheterodyne receiver.

It is a principal object of the present invention to provide a regulation circuit for a superheterodyne receiver.

It is another object of the present invention to provide a superheterodyne receiver having means for feeding back a portion of the intermediate frequency to the superheterodyne oscillator and having an electronic switch disposed in circuit with the feedback means to interrupt the feedback signal when unwanted frequencies exist in the feedback path.

It is also an object of the present invention to provide a blocking band filter to control the operation of said electronic switch.

It is a further object of the present invention to provide a band pass filter to control the operation of said electronic switch wherein the band pass corresponds substantially to the pass band of the intermediate frequency filter.

These and other objects, features and advantages of the invention will be readily apparent from the following description of a preferred embodiment thereof, taken in conjunction with the accompanying drawings, although variations and modifications may be effected without departing from the spirit of the novel concepts of the disclosure.

DESCRIPTION OF THE PREFERRED EMBODIMENT

Figures 1, 2, 3:
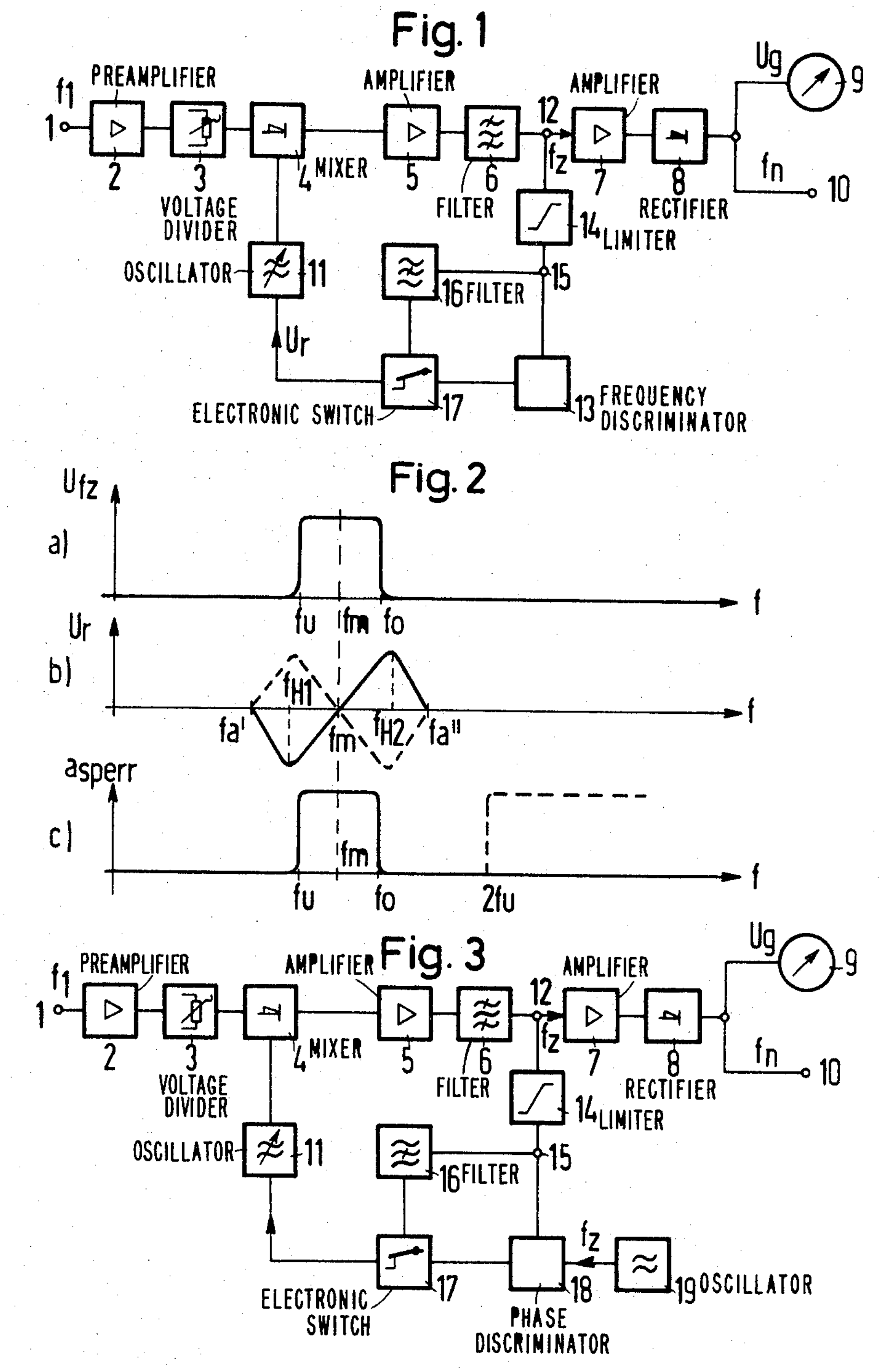
FIG. 1 is a block diagram of a preferred embodiment of the present invention.
FIG. 2 shows a series of graphs illustrating the pass bands operable in connection with the circuit of FIG. 1.
FIG. 3 is an alternate form of the present invention also shown in block diagram configuration. All of the elements of FIGS. 1 and 3 are shown in block form since in themselves, they are well known in the art.

The present invention relates to a superheterodyne receiver having an automatic frequency control for the intermediate frequency thereof. A regulating circuit is provided in such a manner that the radio frequency after mixing with the superheterodyne frequency, develops an intermediate frequency which is within the prescribed limits of a pass band filter.

There is always the danger in a superheterodyne receiver that the frequency control will develop an intermediate frequency which does not correspond to the filter pass band for which the receiver is designed. For instance, the frequency control can be distorted into the presence of subharmonics of the intermediate frequency or the like. In such case, the receiver operates faultily as is well understood.

The present invention is directed to the problem of eliminating such faulty operation by providing an additional regulating circuit which includes an electronic switch in such a way that when frequencies occur outside of the intermediate frequency filter pass range, the electronic switch interrupts the feedback circuit and prevents faulty control of the superheterodyne oscillator. In this way, the automatic tuning of the receiver is limited exclusively to the prescribed intermediate frequency range.

In one form of the invention, a limiter is used, and in this case, the output side of the limiter is used to control the electronic switch, and in this way, harmonics generated in the limiter are prevented from producing faulty regulation of the superheterodyne oscillator.

According to one form of the invention, the electronic switch is constructed in the form of a normally closed switch and is opened by means of voltages which are developed from a pass band block with a blocking range corresponding to the intermediate filter pass band range.

According to another form of the invention, the switch may be normally opened and may be closed by means of a voltage applied through a pass band filter having a pass range corresponding generally to the range of the intermediate frequency filter.

According to another form of the invention, the switch is additionally controlled through a further filtering means in such a way that when harmonics of frequencies within the intermediate frequency range appear, they do not interrupt the regulation circuit. In this way automatic tuning is maintained even though there are severe harmonics developed in the mixer or limiter.

Referring to FIG. 1 in greater detail, the input 1 of FIG. 1 receives a radio frequency signal of frequency $f_1$ which is then coupled to a preamplifier 2 and a voltage divider 3 to an input of a mixer 4.

At the output of the mixer 4, the intermediate frequency $f_z$ is available. An amplifier 5 may be provided along with a filter 6. The filter 6 may be referred to as an intermediate band pass filter.

The intermediate frequency then passes through an amplifier 7 and a rectifier circuit 8. The output of the unit 8 then produces a signal having a frequency $f_n$ and a voltage $U_g$ which information may be used for various purposes.

The intermediate frequency $f_z$ is then coupled from a circuit point 12 through a limiter 14 to a frequency discriminator 13. The output of the frequency discriminator 13 is coupled to an electronic switch 17. The switch 17 may be a logic type switch which is operated either by the presence or absence of a signal at its input. This output takes the form of a regulating voltage $U_r$ which is then coupled to a superheterodyne oscillator 11. The output of the superheterodyne oscillator having a frequency $f_u$ is then coupled back to the mixer 4 for developing the intermediate frequency at the output thereof.

A circuit point 15 which is intermediate the limiter 14 and the frequency discriminator 13 is coupled to a filter 16, and the output of the filter 16 is coupled to the electronic switch 17 for controlling the same.

The functioning of the circuit of FIG. 1 can be understood by reference to the frequency diagram in FIG. 2.

FIG. 2*a* shows the transmission characteristic referred to as the circuit point 12 in FIG. 1. In particular, the intermediate pass band range is shown to exist between the points $f_u$ and $f_o$. The absolute band width $f_o - f_u$, however, does not have to correspond to the full width in the intermediate frequency portion of the superheterodyne receiver. Thus for example, it is frequently advantageous to provide a relatively large band width filter at the circuit point 12 in order to improve the regulation effects of the feedback circuit and to provide an additional narrower band intermediate frequency filter on the output side of the circuit point 12.

The frequency discriminator 13 presents a characteristic curve in accordance with FIG. 2*b* which indicates the direct voltage developed as a function of the frequency supplied to it. It can be seen that a stronger DC voltage develops as the frequency deviates from the normal intermediate frequency.

The voltage in the regulating circuit which is available at the circuit point 15 is conducted through the filter 16 and used to control the electronic switch 17 which is arranged between the output of the frequency discriminator 13 and the input of the superheterodyne oscillator 11. The control of the switch 17 is accomplished in such a manner that voltages appearing at the circuit point 15 which have frequency components lying outside of the filter pass band, interrupt the feedback circuit.

In other words, with the switch 17 operating in a normally closed position, and using the filter 16 as a band block with a blocking attenuation according to FIG. 2c, the switch 17 will be opened whenever a signal appears which is outside of the intermediate frequency pass band.

As an alternative, the switch 17 can also be constructed as normally open contact which is closed whenever frequencies appear in a pass band filter also identified by numeral 16 where the pass band has substantially the same range as the range of the intermediate frequency pass band filter.

If the superheterodyne oscillator 11 is set to a frequency which yields a conversion of the radio frequency to a sub-harmonic of the intermediate frequency, and in the absence of the circuit parts 16 and 17, there could be obtained an erroneous coupling of the feedback signal in the regulation circuit. In other words, the presence of certain harmonics could tend to produce regulation when regulation was not required. This is prevented, however, by the described control of the switch 17 since the switch 17 interrupts the feedback signal when frequencies appear which are outside of the intermediate frequency pass band.

Other circumstances may arise in which signals may appear outside of the pass band of the intermediate frequency filter where it is not desired to produce regulation in response thereto. Accordingly, the circuits 16–17 interrupt the feedback signal and prevent such regulation.

A further advantage of the superheterodyne receiver according the undesired the present invention lies in that on switching off the signal through the input 1 of the receiver there is prevented the undesired regulation of the superheterodyne frequency which is due to the noise voltage generated by the limiter amplifier.

The filter circuit 16 is constructed in such a manner that, according to FIG. 2c, beside the blocking attenuation in the frequency range from $f_u$ to $f_o$ there is also connected a blocking attenuation in the frequency range which corresponds to the harmonics of frequencies which lie in the intermediate frequency range.

For example, this can be provided by having a low pass filter with a limit frequency of $2f_u$ in series with the filter circuit 16. This branch is indicated by the broken lines in FIG. 2c. Hereby there is achieved the advantage that the regulation action can be maintained even in the case of strong harmonics in the mixer 4 and in the limiter 14.

The specific arrangement of the present invention can be deviated from without departing from the basic features disclosed herein. For instance, further circuit parts may be used in the regulating circuit such as further amplifiers or selective devices. In addition, the regulating signal may be picked off at other circuit points beside the circuit point 15 so long as this takes place before the input of the frequency discriminator 13.

A further embodiment of the present invention is shown in FIG. 3 which has a basic circuit diagram quite similar to FIG. 1. Here the distinction is primarily that the frequency discriminator 13 is replaced with a phase discriminator 18 as a regulating voltage generator. For this purpose, a reference voltage of the frequency $f_z$ which is generated by a frequency stabilized oscillator 19 is provided. The phase discriminator 18 compares the reference signal with the output from the circuit point 12 to develop a direct current which is proportional to the deviation in phase between the two. In this case, the frequency regulation occurs with extreme accuracy and has all of the advantages of regulation described in connection with FIG. 1.

The preferred embodiments of the present invention can be used in a superheterodyne receiver used for message transmissions and also for measuring purposes. In the latter case, the reception frequency $f_i$ is regularly and periodically varied with the measuring receiver remaining automatically tuned to the measuring frequency.

I claim as my invention:

1. A superheterodyne receiver having an automatic intermediate frequency control circuit comprising:

means for receiving a radio frequency,
a superheterodyne oscillator,
means for mixing the superheterodyne oscillator signal with the radio frequency signal to generate an intermediate frequency signal,
feedback means for controlling the frequency of said superheterodyne oscillator to within prescribed limits, and
an electronic switch in said feedback path to disconnect the feedback path when frequencies occur therein which are outside a given desired deviation from said intermediate frequency,
an intermediate frequency band pass filter being provided in circuit with said superheterodyne receiver and the given desired deviation of frequencies which determine the operation of said electronic switch lying substantially outside the limits of said band pass filter,
said electronic switch being operated in a normally closed position, and a band block filter being coupled to a circuit point of intermediate frequency, the band of said band block filter corresponding substantially to the intermediate frequency band of said pass band filter, and 1
wherein the output of said band block filter is used to operate said electronic switch to an open circuit condition.

2. A superheterodyne receiver having an automatic intermediate frequency control circuit comprising:

means for receiving a radio frequency,
a superheterodyne oscillator,
means for mixing the superheterodyne oscillator signal with the radio frequency signal to generate an intermediate frequency signal,
feedback means for controlling the frequency of said superheterodyne oscillator to within prescribed limits, and
an electronic switch in said feedback path to disconnect the feedback path when frequencies occur therein which are outside a given desired deviation from said intermediate frequency,
an intermediate frequency band pass filter being provided in circuit with said superheterodyne receiver and the given desired deviation of frequencies which determine the operation of said electronic switch lying substantially outside the limits of said band pass filter,
a limiter being provided in said feedback means and wherein said electronic switch is controllable by a signal derived from the output of said limiter,
said electronic switch being operated in a normally open position wherein a further band pass filter is provided having a pass range substantially corresponding to the pass range of said intermediate frequency pass band filter, and wherein the output of said further band pass filter is used to operate said electronic switch to a closed circuit condition.

3. A superheterodyne receiver in accordance with claim 1 wherein a limiter is provided in said feedback means and wherein said electronic switch is controllable by a signal derived from the output of said limiter.

4. A superheterodyne receiver in accordance with claim 1 wherein means are provided to prevent said electronic switch from being closed due to the presence of harmonics of frequencies within the intermediate frequency filter band pass.

* * * * *